US011999173B2

(12) United States Patent
Naruse et al.

(10) Patent No.: US 11,999,173 B2
(45) Date of Patent: Jun. 4, 2024

(54) MEDIUM INCLUDING HEAT-SENSITIVE MEDIUM PROVIDED WITH BASE MATERIAL HAVING UNEVEN SHAPE, AND ADHESIVE MEDIUM BONDED TO HEAT-SENSITIVE MEDIUM

(71) Applicant: BROTHER KOGYO KABUSHIKI KAISHA, Nagoya (JP)

(72) Inventors: Yuki Naruse, Toyoake (JP); Keisuke Nishihara, Nagoya (JP); Akira Minami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 48 days.

(21) Appl. No.: 17/561,573

(22) Filed: Dec. 23, 2021

(65) Prior Publication Data

US 2022/0203701 A1 Jun. 30, 2022

(30) Foreign Application Priority Data

Dec. 28, 2020 (JP) ................................ 2020-219212

(51) Int. Cl.
*B41J 2/32* (2006.01)
*B41J 3/407* (2006.01)
(Continued)

(52) U.S. Cl.
CPC ............... *B41J 2/32* (2013.01); *B41J 3/4075* (2013.01); *B41J 11/002* (2013.01); (Continued)

(58) Field of Classification Search
CPC . B41J 2/32; B41J 3/4075; B41J 15/044; B41J 11/00; B41J 32/002; B41M 5/42; (Continued)

(56) References Cited

U.S. PATENT DOCUMENTS

| | | | |
|---|---|---|---|
| 5,087,601 | A | 2/1992 | Hotta et al. |
| 5,860,751 | A | 1/1999 | Ogasawara |

(Continued)

FOREIGN PATENT DOCUMENTS

| | | | |
|---|---|---|---|
| EP | 1 297 966 | A2 | 4/2003 |
| EP | 3 437 893 | A1 | 2/2019 |

(Continued)

OTHER PUBLICATIONS

The extended European Search Report for the related European Patent Application No. 21217097.1 dated Nov. 24, 2022.

(Continued)

*Primary Examiner* — Kristal Feggins
(74) *Attorney, Agent, or Firm* — KENEALY VAIDYA LLP

(57) ABSTRACT

A medium includes: a heat-sensitive medium subjected to thermal printing; and an adhesive medium to be superimposed on the heat-sensitive medium in a thickness direction and bonded to the heat-sensitive medium. The heat-sensitive medium includes: a surface contacting the adhesive medium; a heat-sensitive medium base material having a transparency; and a first color producing layer having a transparency. The heat-sensitive medium base material has an uneven shape having roughness greater than that of the surface of the heat-sensitive medium. The first color producing layer is configured to produce a first color when heated to a temperature higher than or equal to a first temperature. The adhesive medium includes: an adhesive medium base material; and an adhesive layer provided on the adhesive medium base material. The adhesive layer makes contact with the surface of the heat-sensitive medium so that the adhesive medium is bonded to the heat-sensitive medium.

11 Claims, 9 Drawing Sheets

(51) Int. Cl.
*B41J 11/00* (2006.01)
*B65C 9/18* (2006.01)
*B65C 11/02* (2006.01)

(52) U.S. Cl.
CPC .......... *B65C 9/1803* (2013.01); *B65C 9/1865* (2013.01); *B65C 11/0215* (2013.01); *B65C 2210/0018* (2013.01)

(58) Field of Classification Search
CPC ...... B41M 5/40; B41M 5/41; B41M 2205/36; B65C 11/0215
See application file for complete search history.

(56) References Cited

U.S. PATENT DOCUMENTS

| | | | |
|---|---|---|---|
| 6,589,708 | B1 | 7/2003 | Katano et al. |
| 2003/0092572 | A1 | 5/2003 | Hara |
| 2012/0039651 | A1* | 2/2012 | Yamaguchi ................ B41J 3/50 400/613 |
| 2018/0250957 | A1 | 9/2018 | Yasuki |
| 2018/0250958 | A1 | 9/2018 | Yasuki |
| 2018/0311970 | A1 | 11/2018 | Suzuki |
| 2019/0061375 | A1 | 2/2019 | Matsumoto |
| 2019/0184714 | A1 | 6/2019 | Murabayashi et al. |

FOREIGN PATENT DOCUMENTS

| | | | |
|---|---|---|---|
| JP | H03-007377 | A | 1/1991 |
| JP | H05-201146 | A | 8/1993 |
| JP | 2000-247026 | A | 9/2000 |
| JP | 2008-006830 | A | 1/2008 |
| JP | 2015-024582 | A | 2/2015 |
| JP | 2017-177438 | A | 10/2017 |
| JP | 2018-051850 | A | 4/2018 |
| JP | 2018-167541 | A | 11/2018 |
| WO | 02/096665 | A1 | 12/2002 |

OTHER PUBLICATIONS

The Partial European Search Report for the related European Patent Application No. 21217097.1 dated Aug. 12, 2022.

Japanese Office Action for the related Japanese Patent Application No. 2020-219212 dated Apr. 2, 2024.

* cited by examiner

MEDIUM INCLUDING HEAT-SENSITIVE MEDIUM PROVIDED WITH BASE MATERIAL HAVING UNEVEN SHAPE, AND ADHESIVE MEDIUM BONDED TO HEAT-SENSITIVE MEDIUM

CROSS REFERENCE TO RELATED APPLICATIONS

This application claims priority from Japanese Patent Application No. 2020-219212 filed Dec. 28, 2020. The entire content of the priority application is incorporated herein by reference.

BACKGROUND

A prior art describes a cartridge, a thermal printer, a heat-sensitive medium, and an adhesive medium. The heat-sensitive medium and the adhesive medium are accommodated in the cartridge. The heat-sensitive medium is superimposed on a base material and produces a single color when heated. The cartridge is attached to the thermal printer when printing operations are performed. The thermal printer performs priming operations by heating the heat-sensitive medium superimposed on the base material. The adhesive medium is subsequently bonded to the printed heat-sensitive medium, whereby a laminated medium is created.

SUMMARY

When light reflects off the base material, there may occur degradation of visibility of the laminated medium which leads to drop in quality of the laminated medium.

In view of the foregoing, it is an object of the present disclosure to provide a cartridge, a thermal printer, a high-quality medium with a simple configuration, and a method of creating the medium.

In order to attain the above and other objects, according to one aspect, the present disclosure provides a medium including: a heat-sensitive medium subjected to printing by a thermal printer; and an adhesive medium to be superimposed on the heat-sensitive medium in a thickness direction of the heat-sensitive medium and the adhesive medium and bonded to the heat-sensitive medium. The heat-sensitive medium includes: a surface that makes contact with the adhesive medium; a heat-sensitive medium base material; and a first color producing layer. The heat-sensitive medium base material has a transparency. The heat-sensitive medium base material has a first surface and a second surface opposite the first surface in the thickness direction. The first surface is positioned closer to the surface of the heat-sensitive medium than the second surface is to the surface of the heat-sensitive medium. The heat-sensitive medium base material has an uneven shape having roughness greater than that of the surface of the heat-sensitive medium. The first color producing layer is provided closer to the first surface than to the second surface of the heat-sensitive medium base material. The first color producing layer has a transparency. The first color producing layer is configured to become less transparent and to produce a first color when heated to a temperature higher than or equal to a first temperature. The adhesive medium includes: an adhesive medium base material; and an adhesive layer. The adhesive layer is an adhesive layer provided on the adhesive medium base material. The adhesive layer makes contact with the surface of the heat-sensitive medium so that the adhesive medium is bonded to the heat-sensitive medium.

Light incident on the medium is scattered by the uneven shape of the heat-sensitive medium base material. Accordingly, the heat-sensitive medium base material can suppress a direct reflection of incident light, thereby enhancing a quality of the medium. Further, the uneven shape is provided on the heat-sensitive medium base material but not the surface of the heat-sensitive medium that makes contact with the adhesive layer, i.e., the surface contacted by a thermal head of the thermal printer. The above configuration can enhance good contact between the thermal head and the heat-sensitive medium.

Since heat transfer performance does not decline when heat from the thermal head is applied to the first color producing layer of the heat-sensitive medium, image quality at a desired density can be attained without applying needless energy to the thermal head. Accordingly, the medium can achieve thermal printing while also improving image quality owing to the uneven shape.

According to another aspect, the present disclosure also provides a cartridge accommodating therein the above-described medium. The cartridge includes: a case; a first holding portion provided inside the case and holding the heat-sensitive medium; and a second holding portion provided inside the case and holding the adhesive medium.

With the cartridge described above, the technical advantages the same as those exhibited by the above-described medium can be obtained.

According to still another aspect, the present disclosure also provides a thermal printer including: an attachment portion to which the above-described cartridge is attachable; a thermal head; a detecting unit; and a controller. The thermal head is configured to perform a printing operation by heating the heat-sensitive medium of the medium accommodated in the cartridge attached to the attachment portion at a position opposite to the heat-sensitive medium base material with respect to the first color producing layer. The detecting unit is configured to detect a type of the cartridge attached to the attachment portion. The controller is configured to perform prescribed heat control for the thermal printer to control the thermal head to perform the printing operation to the heat-sensitive medium. The controller is configured to: on a basis of a detection result of the detecting unit, determine whether or not the heat-sensitive medium base material of the heat-sensitive medium accommodated in the cartridge attached to the attachment portion has the uneven shape; and when determining that the heat-sensitive medium base material of the heat-sensitive medium accommodated in the cartridge attached to the attachment portion has the uneven shape, perform for the thermal head a first heat control different from a second heat control performed when determining that the heat-sensitive medium base material of the heat-sensitive medium accommodated in the cartridge attached to the attachment portion does not have the uneven shape.

When the heat-sensitive medium including the heat-sensitive medium base material having the uneven shape is accommodated in the cartridge, the above-described thermal printer can reduce electrical power consumed by the thermal head.

According to still another aspect, the present disclosure also provides a method for creating the above-described medium with the thermal printer. The method includes: performing a printing operation to the heat-sensitive medium by heating the heat-sensitive medium; and after the performing, bonding the adhesive medium to the surface of the heat-sensitive medium to which the printing operation has been performed in the performing to create the medium.

The medium created through the above method can obtain the technical advantages the same as those in the above-described medium.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Printing System According to the Embodiment

Hereinafter, one embodiment of the present disclosure will be described while referring to FIGS. 1 through 8B. The referenced drawings are used to describe the technical features made possible with the present disclosure. The configurations, control, and the like of the apparatuses described below are merely examples, and the present disclosure is not intended to be limited to these configurations, control, and the like.

A printing system according to the present embodiment will be described. The printing system of the present embodiment includes a thermal printer 1 (see FIG. 1), and a tape cassette 30 (see FIG. 2).

Figure 1:
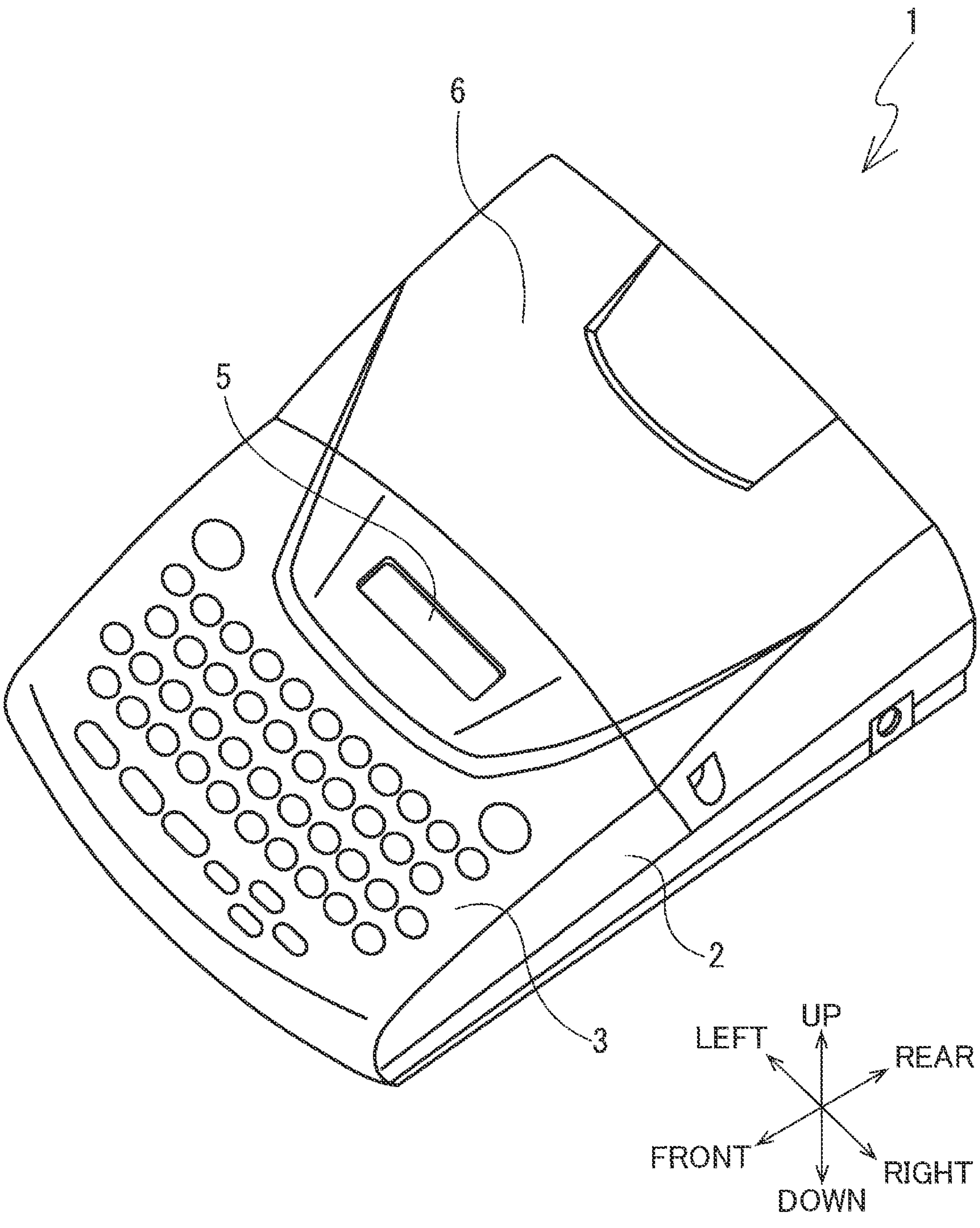
FIG. 1 is a perspective view of a thermal printer.
Figure 2:
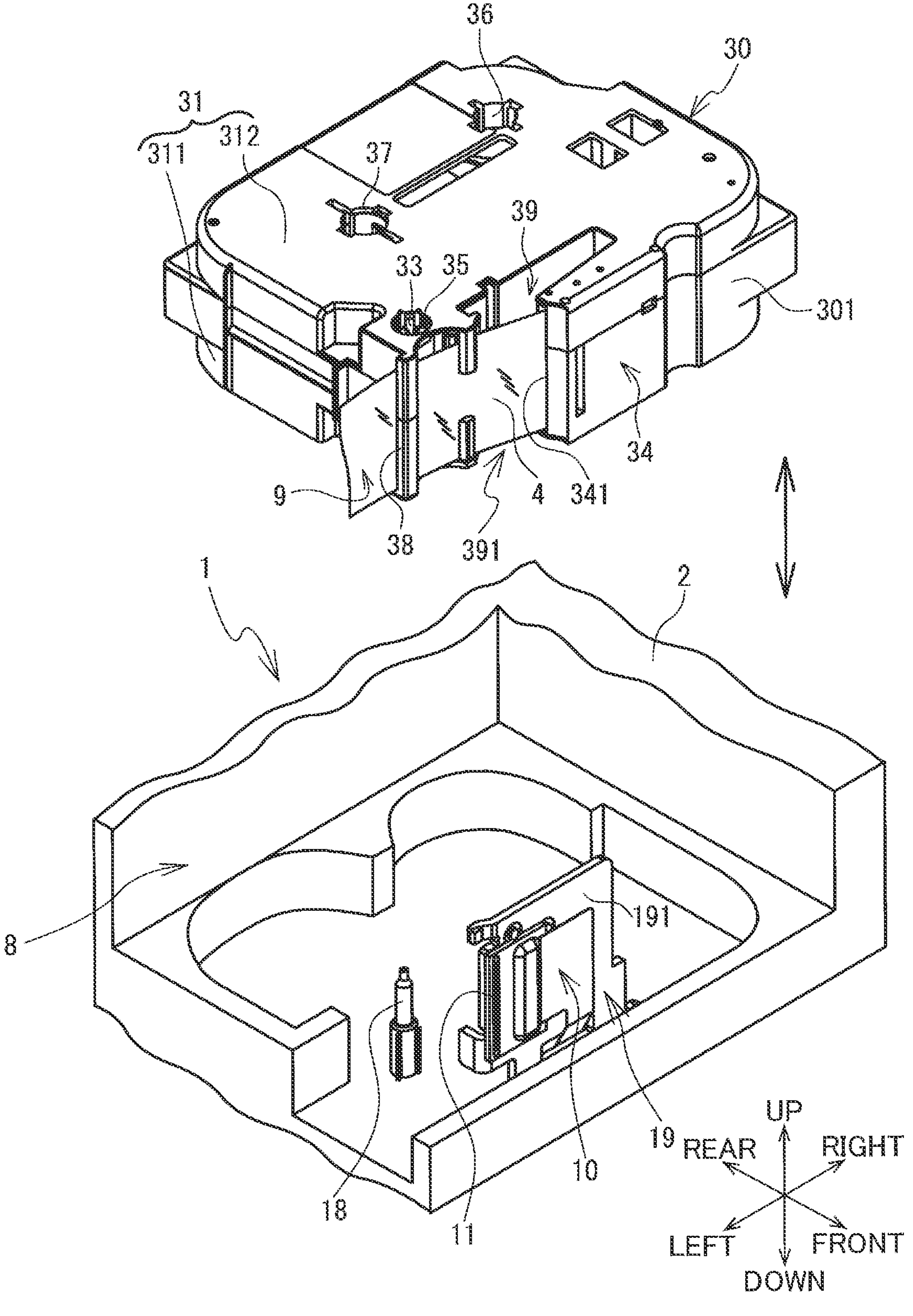
FIG. 2 is a perspective view of a tape cassette and an attachment portion of the thermal printer.

In the following description, a lower-left side, an upper-right side, a lower-right side, an upper-left side, an upper side, and a lower side in FIG. 1 are respectively defined as a front side, a rear side, a right side, a left side, an upper side, and a lower side of the thermal printer 1. Further, a lower-right side, an upper-left side, an upper-right side, a lower-left side, an upper side, and a lower side in FIG. 2 are respectively defined as a front side, a rear side, a right side, a left side, an upper side, and a lower side of the tape cassette 30. Further, the tape cassette 30 attached to an attachment portion 8 of the thermal printer 1 (see FIG. 3) is depicted without an upper case 312 to facilitate understanding.

Using the tape cassette 30, the thermal printer 1 can print characters, symbols, graphics, and the like on a heat-sensitive tape 4. Subsequently, the thermal printer 1 bonds an adhesive tape 7 to the heat-sensitive tape 4 to create a laminated tape 9.

External Configuration of the Thermal Printer 1

As illustrated in FIG. 1, the thermal printer 1 includes a device body 2. The device body 2 has a box shape. A keyboard 3 is provided on an upper surface of the device body 2 in a front portion thereof. A user can input various types of information into the thermal printer 1 by operating the keyboard 3. A display 5 is provided on the upper surface of the device body 2 at a position rearward of the keyboard 3. The display 5 can display thereon inputted information.

A cassette cover 6 is provided at a position rearward of the display 5. The cassette cover 6 can be opened and closed on the device body 2 for exposing or covering the attachment portion 8 described later (see FIG. 2). The user opens and closes the cassette cover 6 when replacing the tape cassette 30 attached to the attachment portion 8 (see FIG. 2) with a new tape cassette 30. A discharge slit (not illustrated) is formed in a rear portion of a left side surface of the device body 2. The laminated tape 9 is discharged out of the thermal printer 1 through the discharge slit.

Internal Configuration of the Thermal Printer 1

As illustrated in FIG. 2, the attachment portion 8 is provided inside the device body 2 below the cassette cover 6 (see FIG. 1). The attachment portion 8 is a recessed part that is recessed downward from the upper surface of the device body 2 with a shape in conformance with a shape of the tape cassette 30. Thus, when the cassette cover 6 is open, the tape cassette 30 is attachable to and detachable from the attachment portion 8.

A head holder 19 is disposed at a front portion of the attachment portion 8. The head holder 19 has a plate-like shape and extends in an up-down direction and a left-right direction. The head holder 19 has a front surface 191. A thermal head 10 is provided on the front surface 191 of the head holder 19. The thermal head 10 includes a plurality of heating elements 11. The heating elements 11 are arranged in line with respect to the up-down direction. In printing operations described later, the thermal head 10 applies heat with the heating elements 11 to the heat-sensitive tape 4 exposed through an opening 341 (described later) while the tape cassette 30 is attached to the attachment portion 8.

A drive shaft 18 for conveying the heat-sensitive tape 4 and the adhesive tape 7 is disposed diagonally leftward and rearward of the head holder 19. The drive shaft 18 extends upward from a bottom surface of the attachment portion 8. A conveying motor 95 (see FIG. 6) drives the drive shaft 18 to rotate.

Figure 3:
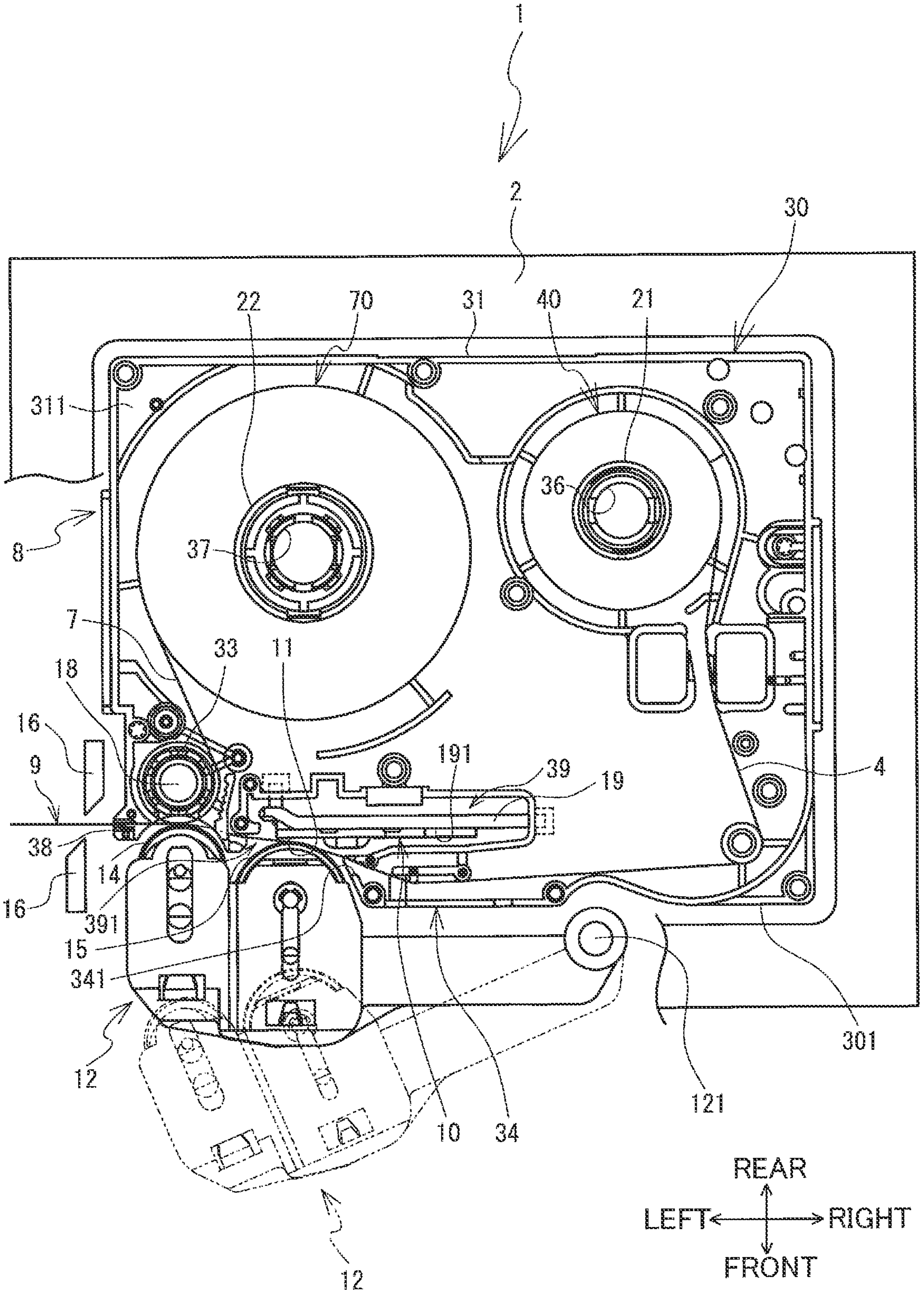
FIG. 3 is a plan view of the attachment portion to which the tape cassette has been attached.

As illustrated in FIG. 3, a cutting mechanism 16 is provided in the device body 2 at a position leftward of the drive shaft 18. When driven by a cutting motor 96 (see FIG. 6) provided in the thermal printer 1, the cutting mechanism 16 cuts the laminated tape 9. A platen holder 12 is provided in the device body 2 at a position frontward of the head holder 19. The platen holder 12 is an arm-like member and is pivotably supported by a support shaft 121 about an axis of the support shaft 121 extending in the up-down direction. The support shaft 121 is provided at a right end portion of the platen holder 12.

A platen roller 15 and a movable roller 14 are rotatably supported by a distal end portion (i.e., a left end portion) of the platen holder 12. The platen holder 12 is pivotally movable between a standby position (a position depicted by dashed lines in FIG. 3) and a printing position (a position depicted by solid lines in FIG. 3). The platen roller 15 is configured to contact and separate from the thermal head 10 in accordance with pivotal movement of the platen holder 12. The movable roller 14 is disposed leftward of the platen roller 15, and is configured to contact and separate from a conveying roller 33 (described later) accordance with the pivotal movement of the platen holder 12.

In the present embodiment, the platen holder 12 is moved toward the standby position to separate away from the attachment portion 8 when the cassette cover 6 is open, and is moved toward the printing position to approach the attachment portion 8 when the cassette cover 6 is closed. In the standby position, the platen holder 12 is in separation from the attachment portion 8. Accordingly, the tape cassette 30 can be attached to or detached from the attachment portion 8.

In the printing position, the platen holder 12 is positioned adjacent to the attachment portion 8. Accordingly, when the tape cassette 30 is attached to the attachment portion 8 and the cassette cover 6 is closed, the platen roller 15 presses the heat-sensitive tape 4 against the thermal head 10, and the movable roller 14 presses the heat-sensitive tape 4 and the adhesive tape 7 against the conveying roller 33 such that the heat-sensitive tape 4 and the adhesive tape 7 are superimposed on each other.

The conveying motor 95 (see FIG. 6) is configured to drive the platen roller 15 to rotate together with the drive shaft 18. In order to avoid slack in the heat-sensitive tape 4 during conveyance of the heat-sensitive tape 4, the platen roller 15 and the drive shaft 18 are coupled to the conveying motor 95 through a plurality of gears (not illustrated) so that a rotational speed of the platen roller 15 is slower than a rotational speed of the drive shaft 18 (the conveying roller 33).

Configuration of the Tape Cassette 30

As illustrated in FIG. 2, the tape cassette 30 includes a cassette case 31. The cassette case 31 has a substantially rectangular parallelepiped shape, and is configured by assembling together a lower case 311 and the upper case 312.

An arm part 34 is provided on a front surface 301 of the cassette case 31. The arm part 34 extends leftward and frontward from a right-front portion of the cassette case 31. The opening 341 is formed in a left end of the arm part 34. The opening 341 is in a form of a slit that is elongated in the up-down direction. The heat-sensitive tape 4 pulled out of a first supply roll 40 described later (see FIG. 3) is configured to be discharged out of the cassette case 31 through the opening 341. In this way, a portion of the heat-sensitive tape 4 is exposed to an outside of the cassette case 31 as illustrated in FIG. 2.

A head insertion section 39 is formed in the cassette case 31 at a position rearward of the arm part 34, and penetrates the cassette case 31 in the up-down direction. A left-front portion of the head insertion section 39 opens frontward. Hereinafter, this opening will be called a head opening 391. The head opening 391 is positioned downstream (leftward) of the opening 341 formed in the arm part 34 in a conveying direction of the heat-sensitive tape 4. The head holder 19 is inserted into the head insertion section 39 when the tape cassette 30 is attached to the attachment portion 8.

The conveying roller 33 is provided leftward of the head insertion section 39. The conveying roller 33 is positioned between the opening 341 and a guide part 38 (described later) in the conveying direction of the heat-sensitive tape 4 (i.e., the leftward direction). The conveying roller 33 has a hollow cylindrical shape extending in the up-down direction. The conveying roller 33 has a front portion that is exposed frontward from the cassette case 31. The conveying roller 33 supports the adhesive tape 7 so that the heat-sensitive tape 4 and the adhesive tape 7 are in a superimposed state. The conveying roller 33 is rotatably supported in a support hole 35 that penetrates the cassette case 31 in the up-down direction. The drive shaft 18 is inserted into the conveying roller 33 when the tape cassette 30 is attached to the attachment portion 8. The drive shaft 18 is configured to drive the conveying roller 33 to rotate so that the rotating conveying roller 33 can convey the heat-sensitive tape 4 and the adhesive tape 7.

The guide part 38 is formed in a left-front corner portion of the cassette case 31. The guide part 38 is positioned downstream (leftward) of the opening 341 in the conveying direction, and specifically, positioned downstream of the conveying roller 33 in the conveying direction. The guide part 38 has a slit-like shape that extends in the up-down direction. When conveyed by the conveying roller 33, the laminated tape 9 passes through the inside of the guide part 38. At this time, the guide part 38 support widthwise ends of the laminated tape 9 so that the laminated tape 9 can maintain an orientation thereof while being discharged from the cassette case 31. In other words, the guide part 38 guides the laminated tape 9 to the outside of the cassette case 31.

As illustrated in FIG. 3, the first supply roll 40 and a second supply roll 70 are accommodated in the cassette case 31. The first supply roll 40 is provided in a right-rear portion of the cassette case 31 and supplies the heat-sensitive tape 4. The first supply roll 40 is configured of the heat-sensitive tape 4 that is wound over a first tape spool 21 in a clockwise direction in a plan view so as to gradually separate from a rotational center of the first tape spool 21. Specifically, the heat-sensitive tape 4 is wound about the first tape spool 21 such that a plurality of heat-sensitive layers 42 is positioned farther inward than a base material 41 described later (see FIG. 4A). The first tape spool 21 is rotatably supported in a support hole 36 that penetrates the cassette case 31 in the up-down direction.

The second supply roll 70 is disposed in a left-rear portion of the cassette case 31, i.e., leftward of the first supply roll 40 and supplies the adhesive tape 7. The second supply roll 70 is configured by the adhesive tape 7 that is wound over a second tape spool 22 in a counterclockwise direction in a plan view so as to gradually separate from a rotational center of the second tape spool 22. More specifically, the adhesive tape 7 is wound about the second tape spool 22 so that a first adhesive layer 73 is positioned further inward than a second adhesive layer 74 (and a release paper 75) described later (see FIG. 4B). The second tape spool 22 is rotatably supported in a support hole 37 that penetrates the cassette case 31 in the up-down direction.

Configuration of the Heat-Sensitive Tape 4

In the following description, an upper side and a lower side of FIGS. 4A to 4C will be referred to as an upper side and a lower side of the tapes (the heat-sensitive tape 4, the adhesive tape 7, and the laminated tape 9), respectively.

Figure 4A:
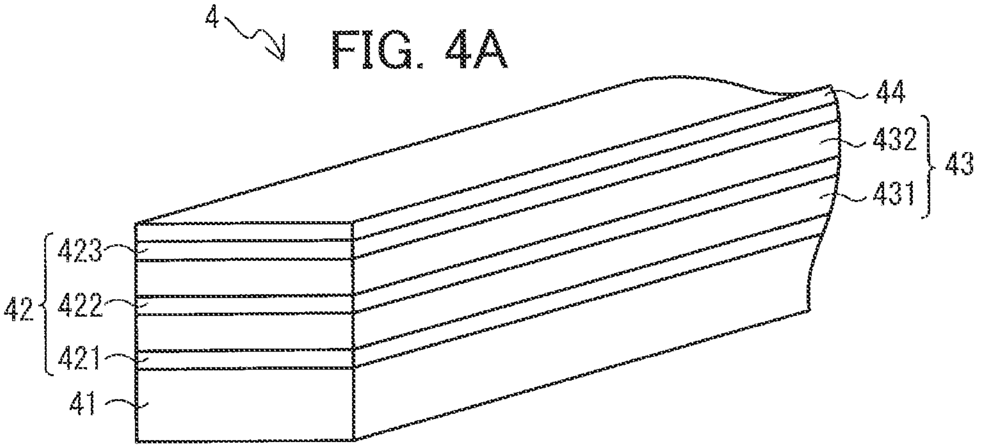
FIG. 4A is a perspective view of a heat-sensitive tape.

As illustrated in FIG. 4A, the heat-sensitive tape 4 is a long strip of a recording medium configured of a plurality of layers superposed on one another. Specifically, the heat-sensitive tape 4 includes the base material 41, the plurality of heat-sensitive layers 42, a plurality of heat-insulating layers 43, and an overcoat layer 44 (hereinafter collectively referred to as “layers of the heat-sensitive tape 4”). In the present embodiment, the heat-sensitive layers 42 include a first heat-sensitive layer 421, a second heat-sensitive layer 422, and a third heat-sensitive layer 423. The heat-insulating layers 43 include a first heat-insulating layer 431, and a second heat-insulating layer 432.

The base material 41, the first heat-sensitive layer 421, the first heat-insulating layer 431, the second heat-sensitive layer 422, the second heat-insulating layer 432, the third heat-sensitive layer 423, and the overcoat layer 44 are superposed in a thickness direction of the heat-sensitive tape 4 (the up-down direction in FIG. 4A) in the stated order, beginning from the lower side of the heat-sensitive tape 4. Thus, the overcoat layer 44 is provided opposite the base material 41 with respect to the heat-sensitive layers 42. That is, the overcoat layer 44 constitutes an upper surface of the heat-sensitive tape 4. Note that each of the base material 41, the first heat-sensitive layer 421, the first heat-insulating layer 431, the second heat-sensitive layer 422, the second heat-insulating layer 432, and the third heat-sensitive layer 423 has transparency.

The base material 41 is a resin film, and specifically a non-foamed resin film, and more specifically a non-foamed polyethylene terephthalate (PET) film. In other words, gas bubbles are not trapped inside the base material 41. An upper surface of the base material 41 has an uneven shape 411 (see FIG. 5A). The uneven shape 411 has roughness greater than that of a surface of the heat-sensitive tape 4 that makes contact with the first adhesive layer 73. Note that the surface of the heat-sensitive tape 4 that makes contact with the first adhesive layer 73 (i.e., the upper surface of the overcoat layer 44) is closer to the upper surface of the base material 41 than to a lower surface of the base material 41.

The uneven shape 411 is formed through a process such as embossing or polishing. The uneven shape 411 can also be formed by adding fine particles to the base material 41 in a manufacturing process. The fine particles may be silica, for example, and are added during the manufacturing process of the base material 41.

Here, the thermal printer 1 also includes a medium sensor 97 (see FIG. 6) for detecting a type of the tape cassette 30. With the medium sensor 97, the thermal printer 1 can detect whether the printing medium accommodated in the attached tape cassette 30 includes the uneven shape 411 in the base material 41.

Each of the heat-sensitive layers 42 is provided on the upper surface of the base material 41, i.e., provided closer to the upper surface of the base material 41 than to a lower surface of the base material 41. Each of the heat-sensitive layers 42 produces a corresponding color when heated to a color-developing temperature specific to the layer. The heat-sensitive layers 42 achieve this effect through the use of chemicals, such as those described in Japanese Patent Application Publication No. 2008-6830.

The first heat-sensitive layer 421 is formed as a film by coating a lower surface of the first heat-insulating layer 431 with a chemical agent. The first heat-sensitive layer 421 is provided on the upper surface of the base material 41, i.e., provided closer to the upper surface of the base material 41 than to the lower surface of the base material 41. The first heat-sensitive layer 421 becomes less transparent and produces a first color when the first heat-sensitive layer 421 is heated to a temperature higher than or equal to a first temperature (prescribed temperature). The first color is cyan in the present embodiment.

The second heat-sensitive layer 422 is formed as a film by coating a lower surface of the second heat-insulating layer 432 with a chemical agent. The second heat-sensitive layer 422 is provided opposite the base material 41 with respect to the first heat-sensitive layer 421. The second heat-sensitive layer 422 becomes less transparent and produces a second color when the second heat-sensitive layer 422 is heated to a temperature higher than or equal to a second temperature. The second temperature is higher than the first temperature. The second color is magenta in the present embodiment.

The third heat-sensitive layer 423 is formed as a film by coating an upper surface of the second heat-insulating layer 432 with a chemical agent. The third heat-sensitive layer 423 is provided opposite to the first heat-sensitive layer 421 with respect to the second heat-sensitive layer 422. The third heat-sensitive layer 423 becomes less transparent and produces a third color when the third heat-sensitive layer 423 is heated to a temperature higher than or equal to a third temperature. The third temperature is higher than the second temperature. The third color is yellow in the present embodiment.

Each of the heat-insulating layers 43 is in a form of a sheet. Owing to low thermal conductivity of the heat-insulating layers 43, the heat-insulating layers 43 function as resistance to heat conduction. Accordingly, a temperature gradient along a direction in which heat is transferred is produced within the heat-insulating layers 43. As will be described later, when the thermal head 10 applies heat to the heat-sensitive tape 4 from the upper side in FIGS. 4A through 4C, a temperature on the lower surface of each layer of the heat-insulating layers 43 will be lower than the temperature on the upper surface of the corresponding layer of the heat-insulating layers 43.

In this way, each layer in the heat-insulating layers 43 can produce a desired difference in temperature between the two layers of the heat-sensitive layers 42 neighboring the corresponding layer in the heat-insulating layers 43 on the upper and lower sides thereof according to the thermal conductivity of each layer in the heat-insulating layers 43.

Specifically, the second heat-insulating layer 432 can produce a lower temperature in the second heat-sensitive layer 422 than the temperature in the third heat-sensitive layer 423. Similarly, the first heat-insulating layer 431 can produce a lower temperature in the first heat-sensitive layer 421 than the temperature in the second heat-sensitive layer 422. In this way, the heat-sensitive tape 4 can be configured to use the effect of the heat-insulating layers 43 to deliberately control the temperature of the first heat-sensitive layer 421 at a temperature higher than the first temperature and lower than the second temperature, the temperature of the second heat-sensitive layer 422 at a temperature higher than the second temperature and lower than the third temperature, and the temperature of the third heat-sensitive layer 423 at a temperature higher than the third temperature.

The overcoat layer 44 is formed as a film by coating an upper surface of the third heat-sensitive layer 423. The overcoat layer 44 can transmit more blue visible light (light having a wavelength of about 470 nm, for example) than yellow visible light (light having a wavelength of about 580 nm, for example). Thus, the overcoat layer 44 has lower visible light transmittance for yellow than visible light transmittance for blue. The overcoat layer 44 protects the heat-sensitive layers 42 at a position opposite the base material 41 with respect to the heat-sensitive layers 42 (i.e., on the upper surface of the heat-sensitive tape 4).

The heat-sensitive tape 4 as a whole has visible light transmittance in the thickness direction of the heat-sensitive tape 4. In other words, all layers of the heat-sensitive tape 4 have visible light transmittance. The visible light transmittance (%) of the base material 41 may be the same as the visible light transmittance of at least one of the heat-sensitive layers 42, the heat-insulating layers 43, and the overcoat layer 44; or may differ from the visible light transmittance of all these layers.

The visible light transmittance for each layer of the heat-sensitive tape 4 is at least 90%, for example, and preferably at least 99%, and more preferably at least 99.9%. Even if less than 90%, the visible light transmittance for each layer should be at least sufficiently high for the user to visually recognize colors produced in the heat-sensitive layers 42 through the base material 41. The layers of the heat-sensitive tape 4 may be transparent or translucent, but are preferably transparent.

The ultraviolet light transmittance (%) of the base material 41 is lower than that of the first heat-insulating layer 431, and specifically lower than the ultraviolet light transmittance of any layer in the heat-insulating layers 43.

The thermal conductivity of the base material 41 is lower than the thermal conductivity of the first heat-insulating layer 431, and specifically lower than the thermal conductivity of any layer in the heat-insulating layers 43. Thermal conductivity (W/K) of a layer is a product of the thermal conductivity of the layer material (W/(m·K)) and the layer thickness (m).

The base material 41 has a refractive index that is higher than that of the first heat-insulating layer 431, and specifically higher than the refractive index of any layer in the heat-insulating layers 43.

The base material 41 has a thickness that is greater than a thickness of the first heat-insulating layer 431, and specifically greater than the thickness of any layer in the heat-insulating layers 43. The thickness of a layer corresponds to a dimension in the up-down direction of the layer in FIG. 4A. In FIG. 4A, the thickness for each layer of the heat-sensitive tape 4 and the relationship among magnitudes of thicknesses of the layers are depicted schematically to facilitate understanding, though the actual layer thicknesses and relationships among these thicknesses may differ from those given in FIG. 4A (this also applies to FIGS. 4B, 5A, 5B, 8A and 8B). For example, the thickness of the overcoat layer 44 may be greater than the thickness of each of the heat-sensitive layers 42, or may be the same or smaller than the thickness of each of the heat-sensitive layers 42.

Configuration of the Adhesive Tape 7

Figure 4B:
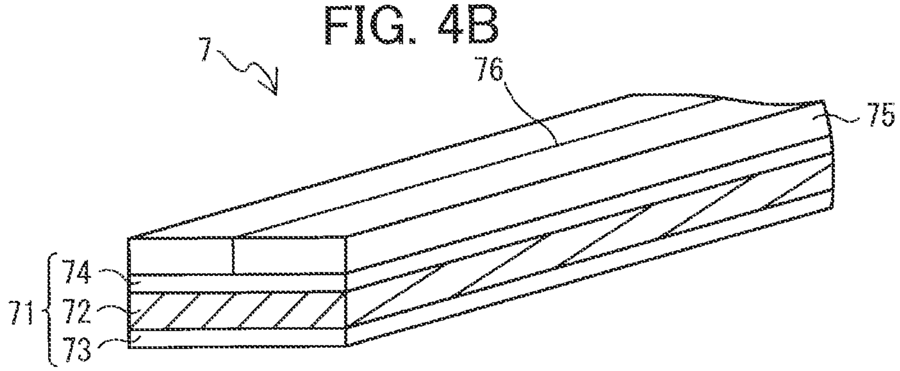
FIG. 4B is a perspective view of an adhesive tape.

As illustrated in FIG. 4B, the adhesive tape 7 is a long strip-like recording medium and is configured of a plurality of layers superposed on one another. Specifically, the adhesive tape 7 includes a double-sided adhesive tape 71, and the release paper 75. The double-sided adhesive tape 71 is white in color. The double-sided adhesive tape 71 includes a sheet 72, the first adhesive layer 73, and the second adhesive layer 74. The sheet 72 is white in color. In FIG. 4B, the sheet 72 (the double-sided adhesive tape 71) is filled with oblique lines to represent the color white (this also applies to FIGS. 4C, 5B and 8B). In the present embodiment, the visible light transmittance of the sheet 72 is lower than the visible light transmittance of any layer in the heat-sensitive tape 4.

The first adhesive layer 73 is provided on a lower surface of the sheet 72, and the second adhesive layer 74 is provided on an upper surface of the sheet 72. That is, the double-sided adhesive tape 71 is configured by applying adhesive to both upper and lower surfaces of the sheet 72.

The release paper 75 is bonded to the double-sided adhesive tape 71 through the second adhesive layer 74. A score line 76 is formed in the release paper 75. The score line 76 extends in a longitudinal direction of the adhesive tape 7 and divides the release paper 75 in two in a lateral direction thereof. The score line 76 does not penetrate into the double-sided adhesive tape 71, and, hence, does not reach the first adhesive layer 73 opposite the release paper 75. The sheet 72 is formed continuously across the score line 76 and, thus, the double-sided adhesive tape 71 is formed continuously across the score line 76. In other words, a portion of the adhesive tape 7 is cut in a thickness direction thereof.

Configuration of the Laminated Tape 9

Figure 4C:
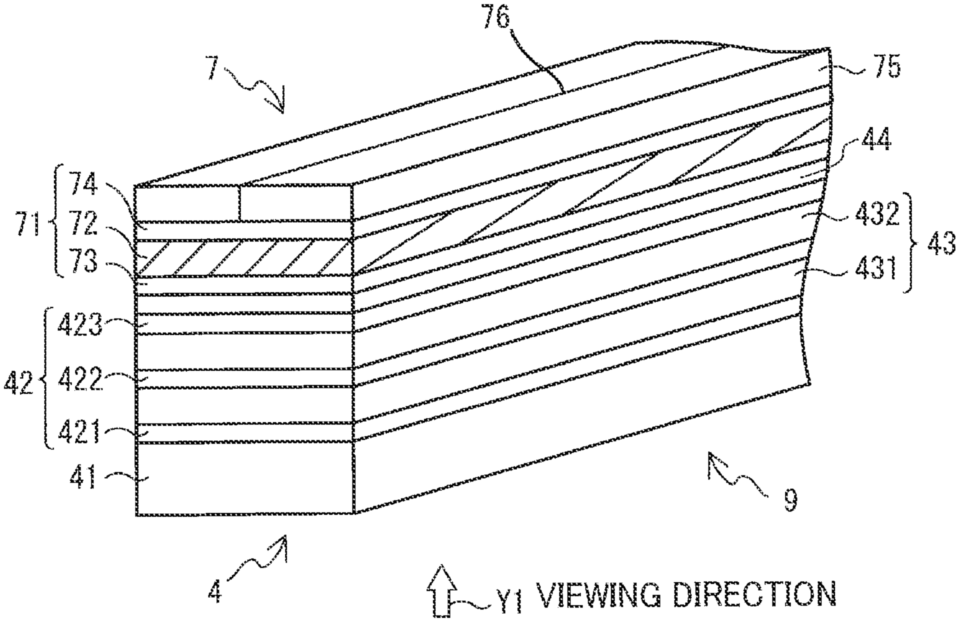
FIG. 4C is a perspective view a laminated tape configured of the heat-sensitive tape and the adhesive tape.

As illustrated in FIG. 4C, the laminated tape 9 is configured by bonding a lower surface of the adhesive tape 7 to the upper surface of the printed heat-sensitive tape 4. Accordingly, the laminated tape 9 includes the base material 41, the first heat-sensitive layer 421, the first heat-insulating layer 431, the second heat-sensitive layer 422, the second heat-insulating layer 432, the third heat-sensitive layer 423, the overcoat layer 44, the first adhesive layer 73, the sheet 72, the second adhesive layer 74, and the release paper 75 that are stacked in the thickness direction in the stated order.

The user views the laminated tape 9 from the base material 41 toward the adhesive tape 7 (i.e., from the lower side of the laminated tape 9), as indicated by a viewing direction Y1 in FIG. 4C. Since the heat-sensitive tape 4 has visible light transmittance as a whole, the user can see developed colors (i.e., printed images) in each of the heat-sensitive layers 42 through the base material 41 and appearance of the adhesive tape 7 as a background when viewing the laminated tape 9 from the base material 41 side toward the adhesive tape 7.

Since the double-sided adhesive tape 71 is white in the present embodiment, the background of the laminated tape 9 appears white when the user views the laminated tape 9 from the base material 41 side toward the adhesive tape 7. The user uses the laminated tape 9 by peeling the release paper 75 off the double-sided adhesive tape 71 and affixing the laminated tape 9 to a given wall, mount, or the like.

Note that the user cannot see developed colors (i.e., the printed images) in the heat-sensitive layers 42 from the adhesive tape 7 side toward the base material 41 (i.e., an upper surface side of the laminated tape 9), even after peeling the release paper 75 off the double-sided adhesive tape 71, because the double-sided adhesive tape 71 is present upward of the heat-sensitive layers 42.

When the user views the laminated tape 9, light incident on the laminated tape 9 is scattered by the uneven shape 411 of the base material 41. Hence, incident light cannot easily be reflected directly off the base material 41, thereby improving visibility for the user. Accordingly, this configuration can improve a quality of the laminated tape 9.

Conveying Paths for the Heat-Sensitive Tape 4 and the Adhesive Tape 7

As illustrated in FIG. 3, the heat-sensitive tape 4 is pulled frontward off a right edge of the first supply roll 40, and then turned leftward in a right-front corner portion of the cassette case 31. The heat-sensitive tape 4 passes through the inside of the arm part 34 and subsequently is discharged out of the cassette case 31 through the opening 341.

Figure 5A:
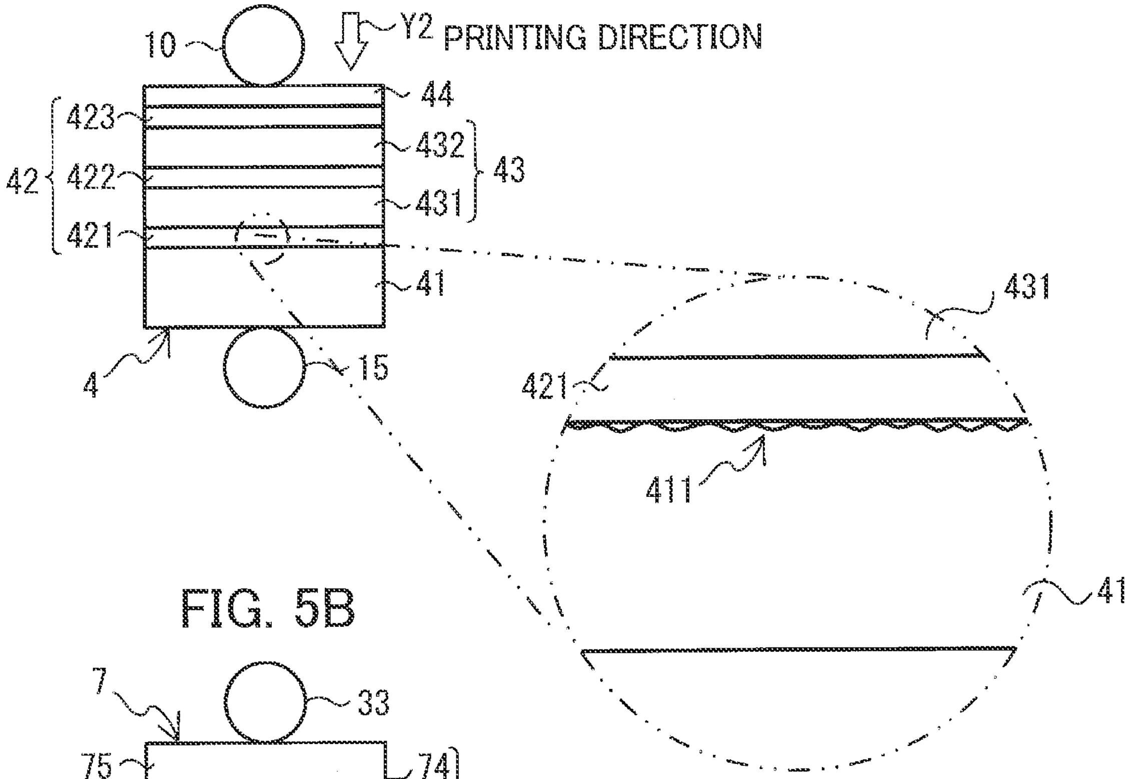
FIG. 5A is a plan view for describing how a printing operation is performed onto the heat-sensitive tape.

While in the head opening 391, the side of the heat-sensitive tape 4 having the heat-sensitive layers 42 (i.e., the upper surface of the heat-sensitive tape 4) faces the thermal head 10 while the base material 41 side of the heat-sensitive tape 4 (a lower surface of the heat-sensitive tape 4) faces the platen roller 15, as illustrated in FIG. 5A. Thus, while the tape cassette 30 is attached to the attachment portion 8, the thermal head 10 is positioned opposite the base material 41 with respect to the heat-sensitive layers 42 (i.e., positioned rearward of the heat-sensitive tape 4). Accordingly, the thermal head 10 can heat the heat-sensitive tape 4 in the head opening 391 on the opposite side of the heat-sensitive tape 4 from the base material 41 (see a printing direction Y2 in FIG. 5A).

Figure 5B:
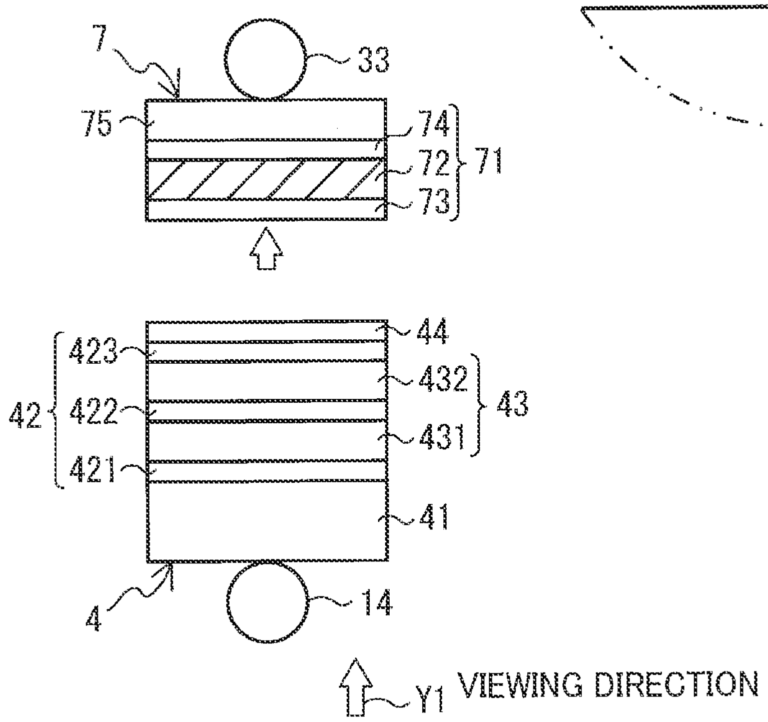
FIG. 5B is a plan view for describing how the adhesive tape is bonded to the printed heat-sensitive tape.

As illustrated in FIG. 3, the heat-sensitive tape 4 passes through the head opening 391 and between the conveying roller 33 and the movable roller 14. At this time, the heat-sensitive layers 42 side of the heat-sensitive tape 4 (i.e., the upper surface of the heat-sensitive tape 4) faces the conveying roller 33, while the base material 41 side of the heat-sensitive tape 4 (i.e., the lower surface of the heat-sensitive tape 4) faces the movable roller 14, as illustrated in FIG. 5B.

As illustrated in FIG. 3, the adhesive tape 7 is pulled frontward from a left edge of the second supply roll 70. The adhesive tape 7 then curves leftward while in contact with a right-front circumferential portion of the conveying roller 33. At this time, the release paper 75 side of the adhesive tape 7 (i.e., the upper surface of the adhesive tape 7) faces the conveying roller 33 while the double-sided adhesive tape 71 side (i.e., the lower surface of the adhesive tape 7) faces the movable roller 14, as illustrated in FIG. 5B. Accordingly, with the adhesive tape 7 overlapping the heat-sensitive tape 4 on the opposite side of the heat-sensitive layers 42 from the base material 41, the conveying roller 33 supports the adhesive tape 7 from the opposite side of the heat-sensitive tape 4.

With the heat-sensitive tape 4 and the adhesive tape 7 superimposed on each other, the heat-sensitive tape 4 and the adhesive tape 7 are bonded together between the movable roller 14 and the conveying roller 33, thereby forming the laminated tape 9. As illustrated in FIG. 3, the laminated tape 9 is discharged out of the tape cassette 30 after passing through the inside of the guide part 38. The laminated tape 9 is conveyed to a prescribed position relative to the cutting mechanism 16, and the cutting mechanism 16 cuts the laminated tape 9. Once cut, the laminated tape 9 is discharged from the thermal printer 1 through the discharge slit formed in the device body 2.

Electrical Configuration of the Thermal Printer 1

Figure 6:
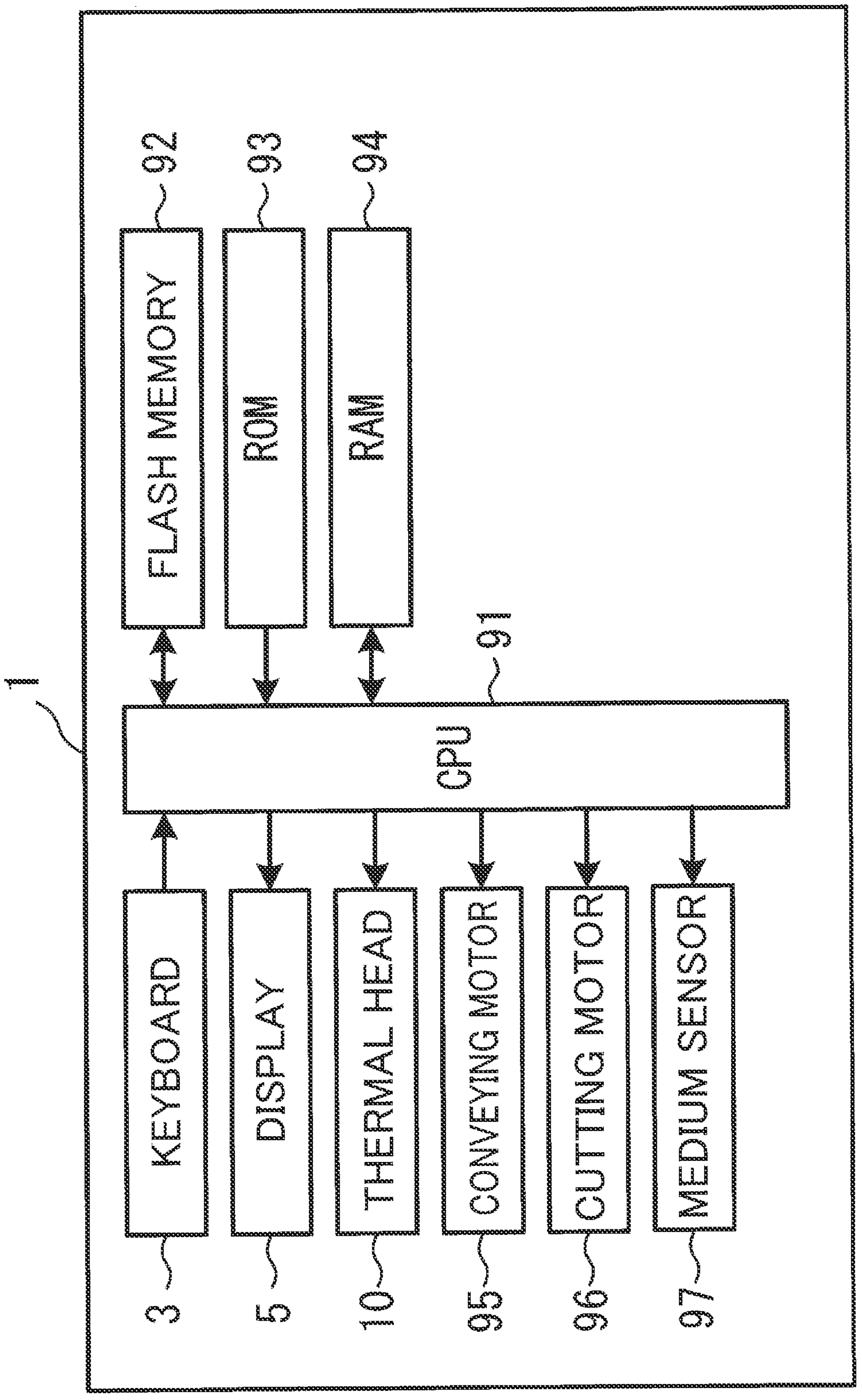
FIG. 6 is a block diagram illustrating an electrical configuration in the thermal printer.

As illustrated in FIG. 6, the thermal printer 1 further includes a CPU 91. The CPU 91 functions as a processor for controlling the thermal printer 1. The CPU 91 is electrically connected to a flash memory 92, a ROM 93, and a RAM 94, as well as the keyboard 3, the display 5, the thermal head 10, the conveying motor 95, the cutting motor 96, and the medium sensor 97 described earlier.

The flash memory 92 stores therein programs executed by the CPU 91, and the like. The ROM 93 stores therein various parameters required for executing the various programs. The RAM 94 stores therein various temporary data, such as print data used for forming images.

Process for Creating Laminated Tape in the Thermal Printer 1

The user inputs a print start command into the thermal printer 1 by operating the keyboard 3. Upon acquiring the print start command, the CPU 91 reads a program from the flash memory 92 and executes a laminated tape creation process illustrated in FIG. 7. In the laminated tape creation process, the CPU 91 controls the thermal printer 1 to perform printing operations in order to create the laminated tape 9.

Figure 7:
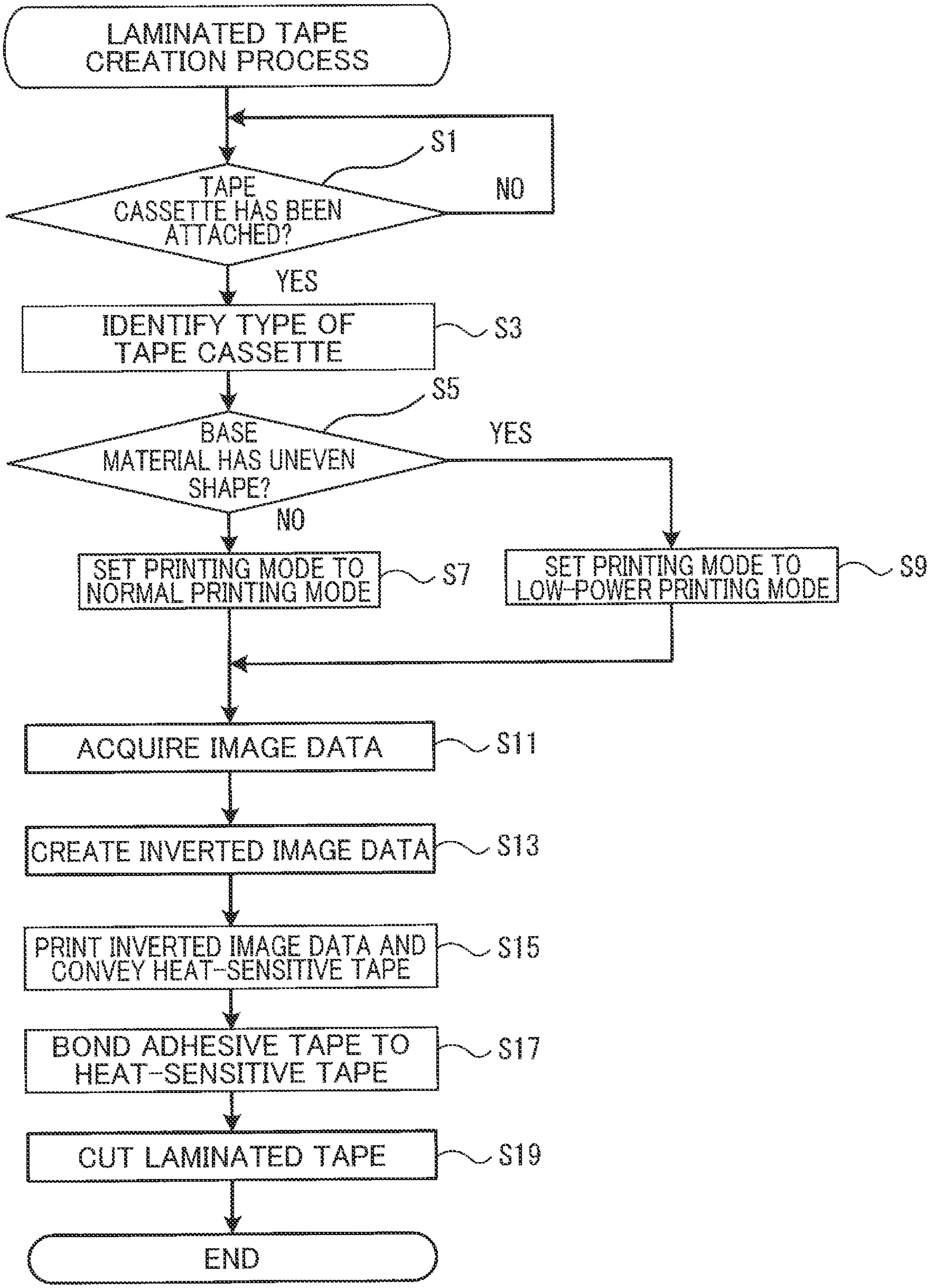
FIG. 7 is a flowchart illustrating a laminated tape creation process.

In S1 of the laminated tape creation process in FIG. 7, the CPU 91 determines whether a tape cassette 30 has been attached to the attachment portion 8. When the CPU 91 determines that a tape cassette 30 has not been attached to the attachment portion 8 (S1: NO), the CPU 91 returns to the process of S1 and waits until a tape cassette 30 has been attached to the attachment portion 8. When the CPU 91 determines that a tape cassette 30 has been attached to the attachment portion 8 (S1: YES), in S3 the CPU 91 identifies a type of the attached tape cassette 30 based on detection results of the medium sensor 97.

In S5, on the basis of the identified type of the tape cassette 30, the CPU 91 determines whether the upper surface of the base material 41 of the heat-sensitive tape 4 accommodated in the attached tape cassette 30 has an uneven shape 411. When the CPU 91 determines that the upper surface of the base material 41 does not have the uneven shape 411 (S5: NO), in S7 the CPU 91 sets a printing mode to a normal printing mode in which the thermal head 10 is driven on the basis of normal printing conditions.

On the other hand, when the CPU 91 determines that the upper surface of the base material 41 has the uneven shape 411 (S5: YES), in S9 the CPU 91 sets the printing mode to a low-power printing mode in which the thermal head 10 is driven on the basis of printing conditions different from the normal printing mode. That is, when determining that the base material 41 has the uneven shape 411, the CPU 91 executes heat control for the thermal head 10 different from thermal control for the thermal head 10 executed when determining that the base material 41 does not have an uneven shape 411.

The thermal printer 1 in the low-power printing mode can perform printing operations using less power than in the normal printing mode. When the base material 41 has the uneven shape 411, heat provided from the thermal head 10 does not escape from the heat-sensitive layers 42 as easily as when the surface of the base material 41 is smooth with no irregularities. In other words, each of the heat-sensitive layers 42 can produce color more readily by virtue of the uneven shape 411 of the base material 41. Therefore, the CPU 91 can perform printing operations while consuming less power in heat control for the thermal head 10.

Thereafter, in S11 the CPU 91 acquires image data representing an image specified by the user. The user specifies the image to be formed on the laminated tape 9 in advance through the keyboard 3. The image to be formed on the laminated tape 9 is an image that can be seen by a user when the user looks at the laminated tape 9 in the viewing direction Y1. Hereinafter, a case in which the user has specified an image of "q" will be described as an example.

Figure 8A:
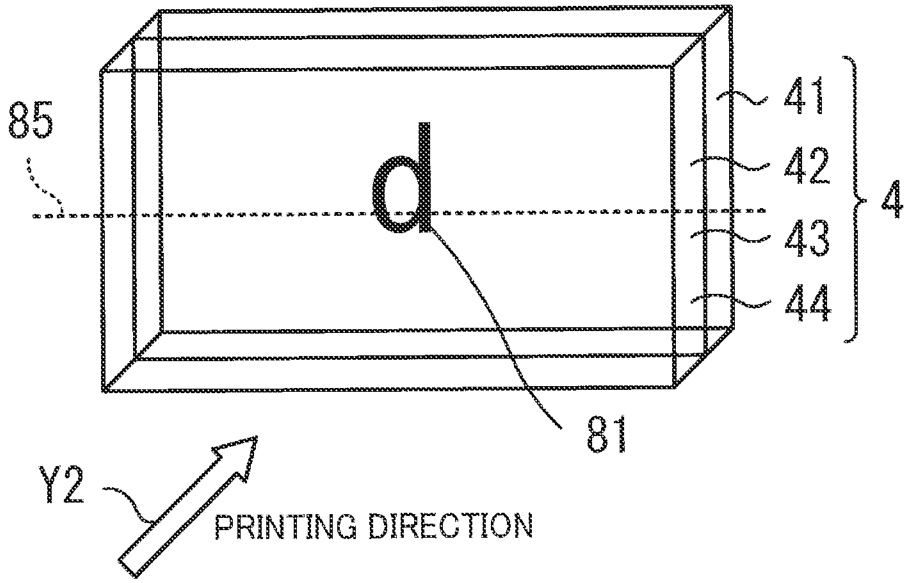
FIG. 8A is a perspective view illustrating how an inverted image is seen on the printed heat-sensitive tape.

In S13 the CPU 91 creates image data representing an inverted image by inverting the acquired image data. Inversion is a process of flipping a content of an image about a horizontal axis. In the example of FIG. 8A, a horizontal line 85 extending in the longitudinal direction of the heat-sensitive tape 4 and passing through the lateral center of the same serves as the axis of rotation, and the content of the image is flipped about the line 85 when the image is viewed in the printing direction Y2. More specifically, when the image of "q" has been specified, the CPU 91 inverts the image of "q" to create image data representing "d" (hereinafter called an inverted image 81), as illustrated in FIG. 8A.

In S15 the CPU 91 performs a printing operation on the basis of the image data created in S13 representing the inverted image. The CPU 91 controls the conveying motor 95 to rotate the drive shaft 18. As the drive shaft 18 is driven to rotate, the heat-sensitive tape 4 is pulled out of the first supply roll 40 and the adhesive tape 7 is pulled out of the second supply roll 70 through cooperative operations of the conveying roller 33 and the movable roller 14.

While continuing to control the conveying motor 95, the CPU 91 further controls the thermal head 10. Specifically, while conveying the heat-sensitive tape 4, the CPU 91 selectively heats the heating elements 11 so that the inverted image created in S13 is formed in the heat-sensitive layers 42. At this time, the thermal head 10 heats the heat-sensitive tape 4 at a position opposite the base material 41 with respect to the heat-sensitive layers 42 as described above, thereby printing the inverted image on the heat-sensitive tape 4.

As illustrated in FIG. 8A, the inverted image 81 is formed in the heat-sensitive layers 42 when the user has specified the image of "q". When viewed in the printing direction Y2, the inverted image 81 represents "d".

In S17 the CPU 91 performs control to bond the adhesive tape 7 to the printed heat-sensitive tape 4. Specifically, by controlling the conveying motor 95 to rotate the drive shaft 18, the CPU 91 conveys the printed heat-sensitive tape 4 and the adhesive tape 7 between the conveying roller 33 and the movable roller 14 so that the adhesive tape 7 is bonded to the surface of the heat-sensitive tape 4 opposite to the base material 41 with respect to the heat-sensitive layers 42, thereby creating the laminated tape 9. In S19 the CPU 91 controls the cutting motor 96 to drive the cutting mechanism 16 in order to cut the laminated tape 9, whereby the laminated tape creation process is completed.

Figure 8B:
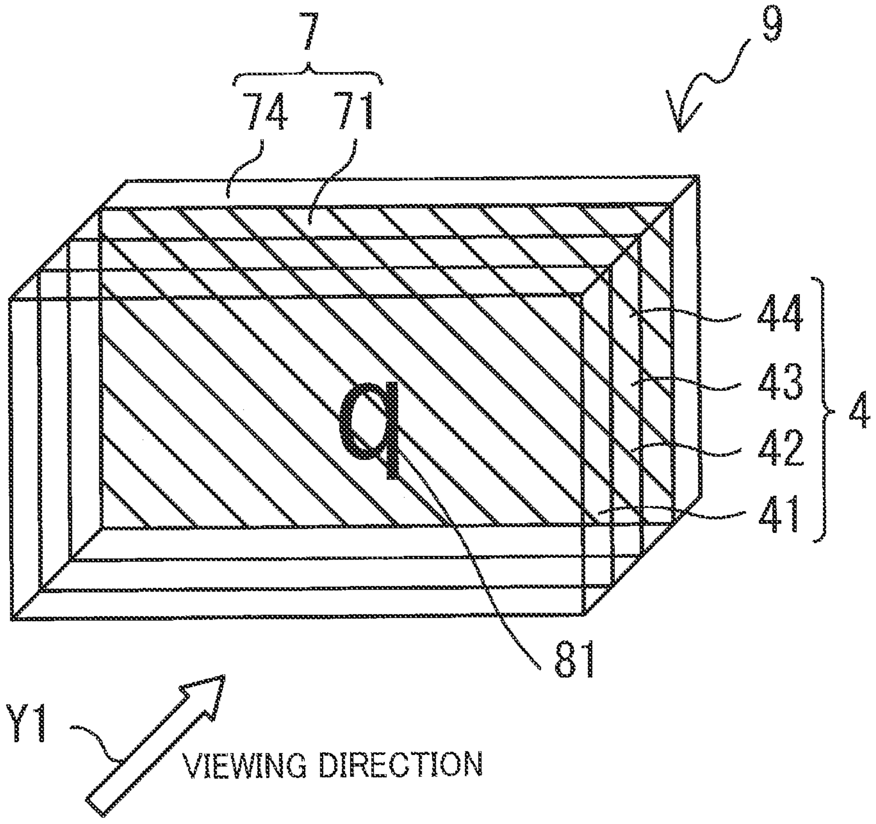
FIG. 8B is a perspective view illustrating how the inverted image is seen on the created laminated tape.

As illustrated in FIG. 8B, the viewing direction Y1 and the printing direction Y2 are directions opposite each other with respect to the heat-sensitive tape 4. Accordingly, when the user views the laminated tape 9 from the base material 41 side toward the adhesive tape 7 (i.e., in the viewing direction Y1), the inverted image 81 represents the image of "q". Hence, the thermal printer 1 has produced the laminated tape 9 having the image of "q" that was specified by the user in this way.

Principal Technical Advantages of the Embodiment

As described above, the laminated tape 9 is configured by superimposing the heat-sensitive tape 4 and the adhesive tape 7 in the thickness direction thereof and bonding the heat-sensitive tape 4 and the adhesive tape 7 together. The base material 41 has the uneven shape 411, which has roughness greater than the surface of the heat-sensitive tape 4 that makes contact with the first adhesive layer 73.

Light incident on the laminated tape 9 is scattered by the unevenness of the base material 41. Therefore, the base material 41 can suppress the direct reflection of incident light, thereby enhancing the quality of the laminated tape 9. Further, the uneven shape 411 is provided on the base material 41 but not the surface of the heat-sensitive tape 4 that makes contact with the first adhesive layer 73, i.e., the surface contacted by the thermal head 10. Accordingly, the thermal printer 1 can ensure that the thermal head 10 and the heat-sensitive tape 4 make good contact.

Since heat transfer performance does not decline when heat from the thermal head 10 is applied to the first heat-sensitive layer 421 of the heat-sensitive tape 4, the thermal printer 1 can achieve image quality at a desired density without applying needless energy to the thermal head 10. Accordingly, the laminated tape 9 can achieve thermal printing while also improving image quality owing to the uneven shape 411.

The second heat-sensitive layer 422 is transparent. When the second heat-sensitive layer 422 is heated to a temperature different from the prescribed temperature, the second heat-sensitive layer 422 becomes less transparent and produces the second color that is different from the first color produced in the first heat-sensitive layer 421. In this way, the laminated tape 9 enables printing operations to be performed in a plurality of colors, thereby enhancing the quality of the printed image.

The uneven shape 411 is provided on the upper surface of the base material 41. Since irregularities are formed in the upper surface of the base material 41, the laminated tape 9 can suppress reflection by scattering incident light. Further, the lower surface of the base material 41 is not uneven or rough and, hence, is not likely to be worn.

The uneven shape 411 is formed through embossing or polishing. Thus, irregularities can be formed in the laminated tape 9 through a simple technique.

The uneven shape 411 can also be formed by adding fine particles to the base material 41. Thus, irregularities can be formed in the laminated tape 9 through a simple technique.

The first tape spool 21 is provided inside the cassette case 31 and holding the heat-sensitive tape 4. Similarly, the second tape spool 22 is provided inside the cassette case 31 to hold the adhesive tape 7. Thus, the tape cassette 30 can accommodate therein the heat-sensitive tape 4 and the adhesive tape 7.

The CPU 91 detects the type of the tape cassette 30 attached to the attachment portion 8. When detecting that the tape cassette 30 attached to the attachment portion 8 accommodates therein the heat-sensitive tape 4 including the base material 41 having the uneven shape 411, the CPU 91 performs heat control for the thermal head 10 in the low-power printing mode. The low-power printing mode is different from the printing mode used when the base material 41 does not have the uneven shape 411. Thus, when the base material 41 of the heat-sensitive tape 4 accommodated in the tape cassette 30 attached to the thermal printer 1 has the uneven shape 411, the thermal printer 1 can reduce the amount of power that the thermal head 10 consumes.

The CPU 91 performs printing operations by heating the heat-sensitive tape 4. After the heat-sensitive tape 4 has been printed in the printing operation, the CPU 91 creates the laminated tape 9 by bonding the adhesive tape 7 to the surface of the heat-sensitive tape 4 opposite the base material 41 with respect to the first heat-sensitive layer 421. Thus, the thermal printer 1 can create a laminated tape 9 with a high quality using the heat-sensitive tape 4 and the adhesive tape 7.

Modifications

While the description has been made in detail with reference to the embodiment, it would be apparent to those skilled in the art that many modifications and variations may be made thereto.

For example, the base material 41 of the above embodiment may be a foamed PET film. Alternatively, the base material 41 may be a resin film formed of polyethylene (PE), polypropylene (PP), ethylene vinyl acetate (EVA) copolymer, ethylene methacrylic acid (EMAA) copolymer, polybutene (PB), polybutadiene (BDR), polymethylpentene (PMP), polyethylene naphthalate (PEN), polybutylene terephthalate (PBT), polyimide (PI), polyetherimide (PEI), polyetherketone (PEK), polyether ether ketone (PEEK), nylon (NY), polyamide (PA), polycarbonate (PC), polystyrene (PS), foamed/expanded polystyrene (FS/EPS), polyvinyl chloride (PVC), polyvinylidene chloride (PVDC), saponified ethylene vinyl alcohol (EVOH), polyvinyl alcohol (PVA), plain transparent (PT) cellophane, moisture-proof sealable transparent (MST) cellophane, polyacrylonitrile (PAN), vinylon (VL), polyurethane (PU), triacetyl cellulose (TAC), or the like. In these cases, the base material 41 may be a foamed or a non-foamed resin film.

Figure 9A:
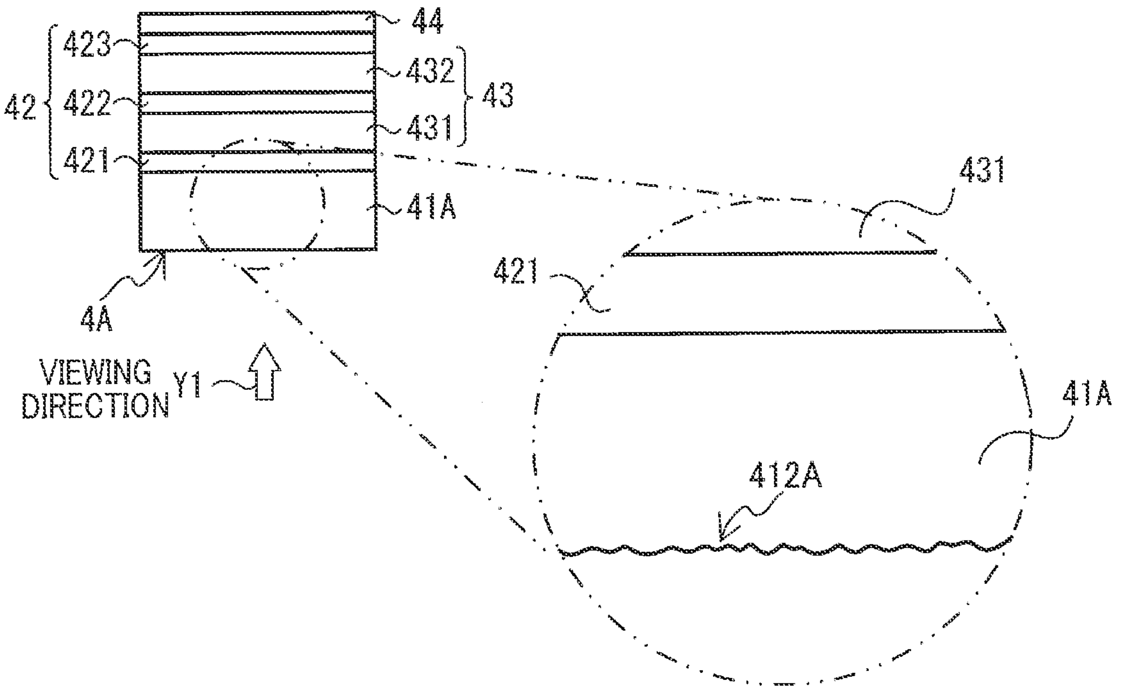
FIG. 9A is a diagram illustrating a heat-sensitive tape.

Although the uneven shape 411 is formed in the upper surface of the base material 41 in the above embodiment, the present disclosure is not limited to this configuration. For example, FIG. 9A illustrates another example of a heat-sensitive tape 4A employed instead of the heat-sensitive tape 4. The heat-sensitive tape 4A includes a base material 41A, and an uneven shape 412A is formed on a lower surface of the base material 41A. In this case, the effect of scattering incident light is even stronger in the laminated tape 9 than when irregularities are provided in the upper surface of the base material, and the laminated tape 9 is also highly weather resistant.

Figure 9B:
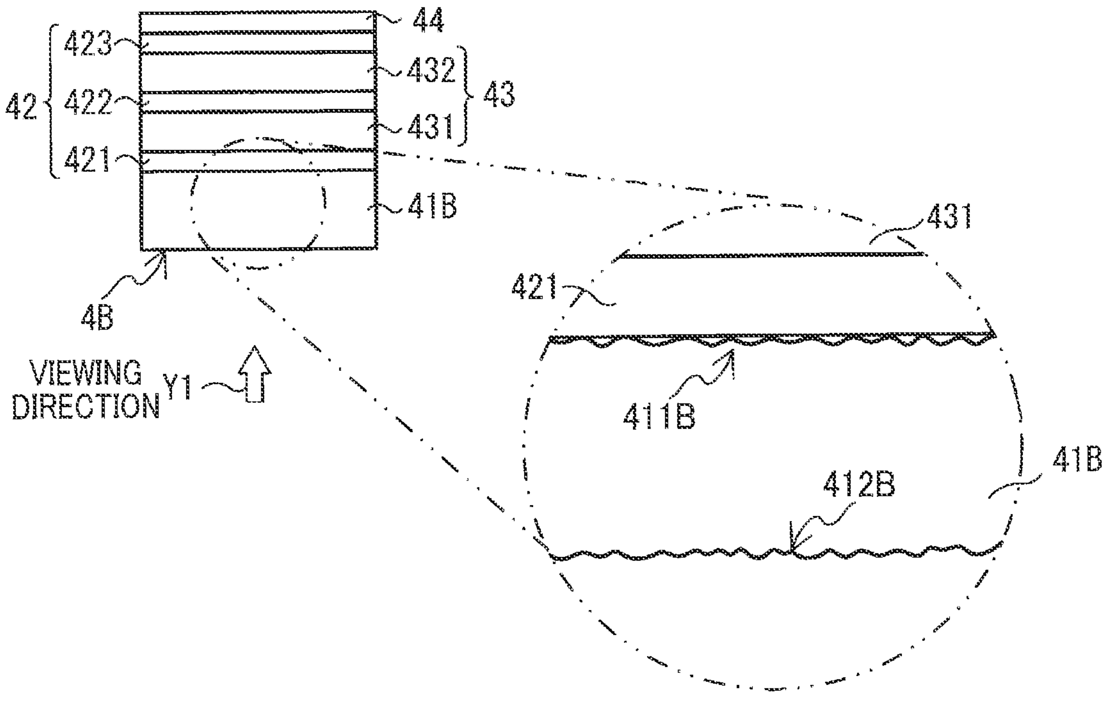
FIG. 9B is a diagram illustrating a heat-sensitive tape.

Further, FIG. 9B illustrates still another example of a heat-sensitive tape 4B instead of the heat-sensitive tape 4 or the heat-sensitive tape 4A. The heat-sensitive tape 4B includes a base material 41B. Uneven shapes 411B and 412B are formed in upper and lower surfaces of the base material 41B, respectively. When forming irregularities in both surfaces, the medium can obtain effects for both the case in Which the upper surface of the base material is uneven and the case in which the lower surface of the base material is uneven. In this way, the uneven shape may be provided on at least one of the upper surface and the lower surface of the base material of the heat-sensitive tape.

Since foamed resin has lower thermal conductivity than the same resin that is not foamed, the thermal conductivity of the base material 41 can be lowered through a simple configuration when the base material 41 is configured of a foamed resin film. When the base material 41 has low thermal conductivity, heat inputted into the heat-sensitive tape 4 from the heat-sensitive layers 42 side is less likely to be diffused in the base material 41 when printing operations are performed in the thermal printer 1.

Accordingly, using a foamed resin film as the base material 41 can reduce a quantity of heat needed to be inputted into the heat-sensitive tape 4 for developing color in the heat-sensitive layers 42 through a simple configuration. In other words, by using a foamed resin film for the base material 41, the quantity of heat inputted into the heat-sensitive tape 4 for producing color in the heat-sensitive layers 42 can be reduced without needing to use a special material in the base material 41 for reducing thermal conductivity.

When the adhesive tape 7 is bonded to the heat-sensitive tape 4 after the thermal printer 1 has printed on the heat-sensitive tape 4, the base material 41 functions as a laminate member for protecting the heat-sensitive layers 42. If the base material 41 has low thermal conductivity, the base material 41 can better prevent unintended discoloration in the heat-sensitive layers 42 caused by heat inputted into the base material 41 from the lower surface of the base material 41 (the surface opposite the heat-sensitive layers 42 with respect to the base material 41) in comparison with a case where the base material 41 is formed of material having high thermal conductivity.

When the base material 41 is configured of a non-foamed resin film, the visible light transmittance of the base material 41 tends to be higher than when the base material 41 is formed of a foamed resin film. Accordingly, the printed image in the laminated tape 9 will appear clear and distinct to the user.

Provided that the base material 41 has sufficient visible light transmittance according to the application thereof, the base material 41 may be formed of a metal foil (aluminum foil or copper foil), a vacuum metallized (VM) film, or the like, or may be configured of one of various types of paper, such as translucent paper, washi (traditional Japanese paper), wood-free paper, dust-free paper, glassine, clay-coated paper, resin-coated paper, laminated paper (polyethylene-laminated paper, polypropylene-laminated paper, etc.), synthetic paper, kraft paper, and the like. The base material 41 may also be formed of a nonwoven cloth or a glass cloth, for example.

The overcoat layer 44 of the embodiment may transmit more yellow visible light than blue visible light, and may be a translucent object or an opaque object. Alternatively, the overcoat layer 44 may be made of a material identical to that of the heat-insulating layers 43. In other words, as the overcoat layer 44, another heat-insulating layer (a third heat-insulating layer) may be provided. Still alternatively, the overcoat layer 44 may be omitted. In this case, thermal conductivity from the thermal head 10 to the heat-sensitive layers 42 is enhanced. Accordingly, the thermal printer 1 can shorten a time period for which heat is applied by the thermal head 10, and can reduce the cost required for the overcoat layer 44.

The double-sided adhesive tape 71 (the sheet 72) of the embodiment may be a color other than white or may be colored with one or a plurality of colors. Thus, a pattern or the like may be applied to the double-sided adhesive tape 71 (the sheet 72). By changing the color of the sheet 72, the tape cassette 30 can provide a variety of background colors and patterns that the user sees when the user looks at the laminated tape 9 from the heat-sensitive tape 4 toward the adhesive tape 7 (i.e., in the viewing direction Y1). The thickness of the adhesive tape 7 can more easily be reduced when coloring the sheet 72 than when coloring the first adhesive layer 73, particularly when the double-sided adhesive tape 71 is given a dark color.

The double-sided adhesive tape 71 may be opaque, or may be translucent or transparent. The visible light transmittance of the sheet 72 may be lower than the visible light transmittance of one of the layers in the heat-sensitive tape 4, may be higher than the visible light transmittance of all layers in the heat-sensitive tape 4, or may be higher than the visible light transmittance for one of the layers in the heat-sensitive tape 4.

If the laminated tape 9 is affixed to a prescribed wall, for example, when the double-sided adhesive tape 71 is transparent or translucent (i.e., when the double-sided adhesive tape 71 has visible light transmittance), the wall becomes the background. Accordingly, the user can freely modify the background of the laminated tape 9 according to the wall to which the laminated tape 9 is affixed. At least one of the first adhesive layer 73 and the second adhesive layer 74 may be colored or made opaque.

The adhesive tape 7 in the embodiment may be configured of the sheet 72 and the first adhesive layer 73. In this case, once the laminated tape 9 has been created, the user may apply adhesive to a surface of the sheet 72 opposite the first adhesive layer 73 (i.e., an exposed surface of the sheet 72). Still alternatively, the adhesive tape 7 may also be selfadhesive. When the above configuration is employed in the adhesive tape 7, the second supply roll 70 accommodated inside the tape cassette 30 can be made more compact since the adhesive tape 7 has a smaller thickness. Accordingly, the cassette case 31 of the tape cassette 30 can be made more compact.

The heat-sensitive layers 42 in the above-described embodiment may be configured of just two layers. In other words, the third heat-sensitive layer 423 may be omitted and, hence, the second heat-insulating layer 432 may also be omitted. In this case, the first heat-sensitive layer 421 may be formed by applying a chemical agent to the lower surface of the first heat-insulating layer 431 while the second heat-sensitive layer 422 is formed by applying a chemical agent to the upper surface of the first heat-insulating layer 431. Thus, it is sufficient for the heat-sensitive tape 4 to include at least one heat-insulating layer in the above ease.

Alternatively, the heat-sensitive layers 42 in the present embodiment may be configured of four or more layers. For example, a fourth heat-sensitive layer (not illustrated) may be provided opposite to the second heat-sensitive layer 422 with respect to the third heat-sensitive layer 423. In this case, the fourth heat-sensitive layer produces a fourth color when the fourth heat-sensitive layer is heated to a fourth temperature. The fourth temperature is higher than the third temperature. The fourth color is black, for example. In this configuration, a third heat-insulating layer (not illustrated) is provided between the third heat-sensitive layer 423 and the fourth heat-sensitive layer in the thickness direction.

The first color, the second color, and the third color in the above-described embodiment may be colors other than cyan, magenta, and yellow, respectively. For example, the first color, the second color, and the third color may all be the same color. When multiple layers of the same color are superimposed in the laminated tape 9, the laminated tape 9 can depict depth in the formed image.

The heat-sensitive layers 42 may be formed by applying chemical agent to the upper surfaces of the heat-insulating layers 43. Alternatively, the heat-sensitive layers 42 may be formed in sheets in advance and bonded by adhesive to the respective heat-insulating layers 43.

The ultraviolet light transmittance of the base material 41 may be higher than that of the first heat-insulating layer 431 or may be higher than the ultraviolet light transmittance of all heat-insulating layers 43. The thermal conductivity of the base material 41 may be higher than the thermal conductivity of the first heat-insulating layer 431 or may be higher than the thermal conductivity of all heat-insulating layers 43. The thickness of the base material 41 may be less than the thickness of the first heat-insulating layer 431 or may be less than the thickness of all heat-insulating layers 43.

The refractive index of the base material 41 may be lower than the refractive index of the first heat-insulating layer 431, may be lower than the refractive index of one of the heat-insulating layers 43, or may be lower than the refractive index of all heat-insulating layers 43. When the refractive index of the base material 41 is low, complete reflection of light incident on the base material 41 of the heat-sensitive tape 4 is hard to occur by an interface between the base material 41 and one of the heat-insulating layers 43. Accordingly, the tape cassette 30 can provide the user with the laminated tape 9 having low gloss, known as a matte finish.

The score line 76 described in the embodiment need not be formed in a straight line, but may be formed in a wavy line or the like. Further, a plurality of score lines 76 laterally juxtaposed may be formed in the release paper 75 rather than just a single score line 76. Alternatively, a plurality of score lines 76 extending laterally may be formed at prescribed intervals in the longitudinal direction of the release paper 75. The score lines 76 may also extend obliquely to the lateral and longitudinal directions.

The cassette case 31 in the embodiment described above may accommodate therein a first fanfold stack in place of the first supply roll 40. That is, the first fanfold stack may be accommodated in the cassette case 31 for supplying the heat-sensitive tape 4 that has been folded into a stacked state. Further, a second fanfold stack may be accommodated in the cassette case 31 in place of the second supply roll 70. In other words, the second fanfold stack may be accommodated in the cassette case 31 for supplying the adhesive tape 7 that has been folded into a stacked state.

The first supply roll 40 of the embodiment described above may be a coreless roll that is not wounded over the first tape spool 21. Similarly, the second supply roll 70 may be a coreless roll that is not wounded over the second tape spool 22.

The conveying roller 33 described in the embodiment may be provided as a component in the thermal printer 1, not a component in the tape cassette 30. In other words, the conveying roller 33 may be mounted on the drive shaft 18 in advance, and the printed heat-sensitive tape 4 and the adhesive tape 7 may be bonded together by members in the thermal printer 1 (the conveying roller 33 mounted on the drive shaft 18 in advance and the movable roller 14).

The CPU 91 need not perform the process of S13 of the laminated tape creation process described in the above embodiment. In other words, the CPU 91 need not create inverted image data. In this case, the user may invert the image to be formed on the laminated tape 9 and may input this inverted image data into the thermal printer 1. Thus, if the image to be formed on the laminated tape 9 is "q", the user specifies "d". The processes in S11 and S13 may be executed on an external device connected to the thermal printer 1, such as a personal computer or a smartphone.

The user may cut the laminated tape 9 manually. The cutting mechanism 16 may execute a half-cut by cutting through the entire heat-sensitive tape 4 of the laminated tape 9 in the thickness direction while the adhesive tape 7 remains continuously intact in the longitudinal direction at the cutting position.

The user may also manually bond the printed heat-sensitive tape 4 to the adhesive tape 7. In this case, the thermal printer 1 need not be provided with a mechanism for bonding the heat-sensitive tape 4 to the adhesive tape 7.

Further, a portion of an upper surface, a lower surface, and side surfaces of the cassette case 31 may be dispensed with. The conveying roller 33 may also be a non-rotatable member such as a fixed cylindrical member or a plate-shaped member. In this case, a driving force from the conveying motor 95 may be transmitted to the movable roller 14, for example.

In the embodiment described above, the heat-sensitive tape 4 has a plurality of beat-sensitive layers 42. However, the heat-sensitive tape 4 may have just a single heat-sensitive layer (i.e., the first heat-sensitive layer 421) instead. In this case, the base material 41, the first heat-sensitive layer 421, the first heat-insulating layer 431, and the overcoat layer 44 are superimposed in the stated order, for example. After the heat-sensitive tape 4 has been printed, the adhesive tape 7 having the score line 76 is bonded to the opposite side of the heat-sensitive tape 4 from the base material 41.

Accordingly, this tape cassette can suppress deterioration in print quality occurred by the score line 76. That is, since the adhesive tape 7 is bonded to the heat-sensitive tape 4 after the heat-sensitive tape 4 has been printed, the tape cassette 30 can suppress occurrence of the white line effect not only when the heat-sensitive tape 4 possesses a plurality of heat-sensitive layers 42, but also when the heat-sensitive tape 4 possesses just a single heat-sensitive layer.

Note that, when the heat-sensitive tape 4 possesses just a single heat-sensitive layer, both the first heat-insulating layer 431 and the overcoat layer 44 may be omitted. In this case, the single heat-sensitive layer may be formed by applying a chemical agent to the upper surface of the base material 41.

The CPU 91 may create image data representing an inverted image in the process of S13 by flipping the content of the image about an axis of rotation extending parallel to the lateral direction of the heat-sensitive tape 4 and passing through the longitudinal center of the heat-sensitive tape 4 when viewing the image in the printing direction Y2. More specifically, if an image of "q" has been specified by the user, the CPU 91 may invert the image of "q" to create image data representing "p" instead of the image "d" described in the embodiment.

In place of the CPU 91, the thermal printer 1 may employ a microcomputer, an application specific integrated circuit (ASIC), a field-programmable gate array (FPGA), or the like as the processor. The process for creating a laminated tape may be a distributed process performed by a plurality of processors. The non-transitory storage medium may be any storage medium capable of holding information, regardless of the duration that the information is stored. The non-transitory storage medium need not include transitory storage media (conveyed signals, for example). The program may be downloaded from a server connected to a network (i.e., transmitted as a transmission signal) and stored in the flash memory 92, for example. In this case, the program may be saved in a non-transitory storage medium such as a hard disk drive provided in the server.

The variations described above may be combined together in any way as long as inconsistencies are not produced.

Remarks

The laminated tape 9 is an example of a medium. The heat-sensitive tapes 4, 4A, and 4B are examples of a heat-sensitive medium. The adhesive tape 7 is an example of an adhesive medium. The thickness direction of the heat-sensitive tape 4 and the adhesive tape 7 is an example of a thickness direction. The upper surface of the overcoat layer 44 is an example of a surface that makes contact with the adhesive medium. The base material 41 is an example of a heat-sensitive medium base material. The upper surface of the base material 41 is an example of a first surface, and the lower surface of the base material 41 is an example of a second surface. The uneven shapes 411, 412A, and 411B and 412B are examples of an uneven shape. The first heat-sensitive layer 421 is an example of a first color producing layer. The first temperature is an example of a first temperature. The sheet 72 is an example of an adhesive medium. The first adhesive layer 73 is an example of an adhesive layer. The second heat-sensitive layer 422 is an example of a second color producing layer. The second temperature is an example of second temperature. The first heat-insulating layer 431 is an example of a first insulating layer. The tape cassette 30 is an example of a cartridge. The cartridge case 31 is an example of a case. The first tape spool 21 is an example of a first holding portion. The second tape spool 22 is an example of a second holding portion. The thermal printer 1 is an example of a thermal printer. The attachment portion 8 is an example of an attachment portion. The thermal head 10 is an example of a thermal head. The medium sensor 97 is an example of a detection unit. The CPU 91 is an example pf a controller. The low-power printing mode is an example of a first heat control. The normal printing mode is an example of a second heat control.

What is claimed is:

1. A medium comprising:

a heat-sensitive medium subjected to printing by a thermal printer; and an adhesive medium to be superimposed on the heat-sensitive medium in a thickness direction of the heat-sensitive medium and the adhesive medium and bonded to the heat-sensitive medium, the heat-sensitive medium comprising:

a surface that makes contact with the adhesive medium;

a heat-sensitive medium base material having a transparency, the heat-sensitive medium base material having a first surface and a second surface opposite the first surface in the thickness direction, the first surface being positioned closer to the surface of the heat-sensitive medium than the second surface is to the surface of the heat-sensitive medium, the heat-sensitive medium base material having an uneven shape having roughness greater than that of the surface of the heat-sensitive medium; and a first color producing layer provided closer to the first surface than to the second surface of the heat-sensitive medium base material, the first color producing layer having a transparency, the first color producing layer being configured to become less transparent and to produce a first color when heated to a temperature higher than or equal to a first temperature, the adhesive medium comprising:

an adhesive medium base material; and an adhesive layer provided on the adhesive medium base material, the adhesive layer making contact with the surface of the heat-sensitive medium so that the adhesive medium is bonded to the heat-sensitive medium.

2. The medium according to claim 1, wherein the heat-sensitive medium further comprises a second color producing layer having a transparency, the second color producing layer being configured to become less parent and to produce a second color different from the first color when heated to a second temperature different from the first temperature, and wherein the heat-sensitive medium base material, the first color producing layer, and the second color producing layer are arranged in this order in the thickness direction.

3. The medium according to claim 1, wherein the uneven shape is provided on at least one of the first surface and the second surface of the heat-sensitive medium base material.

4. The medium according to claim 3, wherein, of the first surface and the second surface of the heat-sensitive medium base material, the uneven shape is provided only on the first surface.

5. The medium according to claim 3, wherein, of the first surface and the second surface of the heat-sensitive medium base material, the uneven shape is provided only on the second surface.

6. The medium according to claim 1,
wherein the uneven shape is formed through one of embossing and polishing.

7. The medium according to claim 1,
wherein the uneven shape is formed by adding fine particles to the heat-sensitive medium base material.

8. A cartridge accommodating therein the medium according to claim 1,
the cartridge comprising:
a case;
a first holding portion provided inside the case and holding the heat-sensitive medium; and
a second holding portion provided inside the case and holding the adhesive medium.

9. A thermal printer comprising:
an attachment portion to which the cartridge according to claim 6 is attachable;
a thermal head configured to perform a printing operation by heating the heat-sensitive medium of the medium accommodated in the cartridge attached to the attachment portion at a position opposite to the heat-sensitive medium base material with respect to the first color producing layer;
a detecting unit configured to detect a type of the cartridge attached to the attachment portion; and
a controller configured to perform prescribed heat control for the thermal printer to control the thermal head to perform the printing operation to the heat-sensitive medium, the controller being configured to:
on a basis of a detection result of the detecting unit, determine whether or not the heat-sensitive medium base material of the heat-sensitive medium accommodated in the cartridge attached to the attachment portion has the uneven shape; and
when determining that the heat-sensitive medium base material of the heat-sensitive medium accommodated in the cartridge attached to the attachment portion has the uneven shape, perform for the thermal head a first heat control different from a second heat control performed when determining that the heat-sensitive medium base material of the heat-sensitive medium accommodated in the cartridge attached to the attachment portion does not have the uneven shape.

10. A medium comprising:
a heat-sensitive medium subjected to printing by a thermal printer; and
an adhesive medium to be superimposed on the heat-sensitive medium in a thickness direction of the heat-sensitive medium and the adhesive medium and bonded to the heat-sensitive medium,
the heat-sensitive medium comprising:
a surface that makes contact with the adhesive medium;
a heat-sensitive medium base material having a transparency, the heat-sensitive medium base material having a first surface and a second surface opposite the first surface in the thickness direction, the first surface being positioned closer to the surface of the heat-sensitive medium than the second surface is to the surface of the heat-sensitive medium, the first surface having an uneven shape having roughness greater than that of the second surface; and
a first color producing layer provided closer to the first surface than to the second surface of the heat-sensitive medium base material, the first color producing layer having a transparency, the first color producing layer being configured to become less transparent and to produce a first color when heated to a temperature higher than or equal to a first temperature,
the adhesive medium comprising:
an adhesive medium base material; and
an adhesive layer provided on the adhesive medium base material, the adhesive layer making contact with the surface of the heat-sensitive medium so that the adhesive medium is bonded to the heat-sensitive medium.

11. A medium comprising:
a heat-sensitive medium subjected to printing by a thermal printer; and
an adhesive medium to be superimposed on the heat-sensitive medium in a thickness direction of the heat-sensitive medium and the adhesive medium and bonded to the heat-sensitive medium,
the heat-sensitive medium comprising:
a surface that makes contact with the adhesive medium;
a heat-sensitive medium base material having a transparency, the heat-sensitive medium base material having a first surface and a second surface opposite the first surface in the thickness direction, the first surface being positioned closer to the surface of the heat-sensitive medium than the second surface is to the surface of the heat-sensitive medium, the second surface having an uneven shape having roughness greater than that of the first surface; and
a first color producing layer provided closer to the first surface than to the second surface of the heat-sensitive medium base material, the first color producing layer having a transparency, the first color producing layer being configured to become less transparent and to produce a first color when heated to a temperature higher than or equal to a first temperature,
the adhesive medium comprising:
an adhesive medium base material; and
an adhesive layer provided on the adhesive medium base material, the adhesive layer making contact with the surface of the heat-sensitive medium so that the adhesive medium is bonded to the heat-sensitive medium.

* * * * *